July 27, 1954 B. LIPPEL ET AL 2,685,084
DIGITAL DECODER
Filed April 3, 1951 3 Sheets-Sheet 1

*INVENTOR.*
BERNARD LIPPEL
JOSEPH A. BUEGLER
*BY* Harry M. Saragovitz
Attorney

July 27, 1954 B. LIPPEL ET AL 2,685,084

DIGITAL DECODER

Filed April 3, 1951 3 Sheets-Sheet 2

INVENTOR.
BERNARD LIPPEL
JOSEPH A. BUEGLER

BY

Harry M. Saragovitz
Attorney

July 27, 1954 B. LIPPEL ET AL 2,685,084

DIGITAL DECODER

Filed April 3, 1951 3 Sheets-Sheet 3

INVENTORS
BERNARD LIPPEL
JOSEPH A. BUEGLER

BY Harry M. Saragovitz
Attorney

Patented July 27, 1954

2,685,084

UNITED STATES PATENT OFFICE 2,685,084

DIGITAL DECODER

Bernard Lippel and Joseph A. Buegler, Red Bank, N. J., assignors to the United States of America as represented by the Secretary of the Army Application April 3, 1951, Serial No. 219,104

9 Claims. (Cl. 340—347)

(Granted under Title 35, U. S. Code (1952), sec. 266)

The invention described herein may be manufactured and used by or for the Government for governmental purposes, without the payment of any royalty thereon.

This invention relates to a decoder for digital code group signals. In particular it relates to a decoder in a digital servo system for producing a control potential of polarity and amplitude corresponding to the sense and magnitude of a digital error signal.

The invention is particularly adapted for use in a data transmission system of the type where data representing the position of an input shaft is received and compared with locally generated data representing the position of an output shaft and a comparison of the data is made to develop a control of the output shaft which minimizes the difference.

In prior art systems a variety of decoder arrangements have been proposed which accept digital code group signals and produce output voltage proportional to the number represented by the signals. Where, however, the decoder is called upon to handle input numbers representing both amplitude and direction, the resultant arrangements have in general been complicated and unsatisfactory.

It is, accordingly, an object of the present invention to provide a digital code group signal decoder which operates in an improved manner which avoids many of the disadvantages and limitations of prior art arrangements.

It is also an object of the present invention to provide a decoder for digital code group signals which produces an output voltage of amplitude corresponding to the value of the input number or its complement whichever is the lesser and with a polarity indicating the choice.

It is a particular object of the present invention to provide a decoder for digital code group signals wherein the coding is in standard binary code and to utilize the digit signal in the first digit position to determine the polarity of an output voltage and to assign to the digit signals in the subsequent digit positions a condition of operation as normal or reversed digit signals.

In accordance with the present invention a decoder for digital code group signals comprises means responsive to the digit signal level in the first position of a group for assigning a polarity to an output potential and for simultaneously assigning to the digit signals in the remaining position a corresponding condition of operation as normal or as reversed code group signals. Also there are provided means operatively responsive to the digit signals of the remaining positions for determining the magnitude of the output potential.

For a better understanding of the invention, together with other and further objects thereof, reference is had to the following description taken in connection with the accompanying drawing, and its scope will be pointed out in the appended claims.

Figure 2:
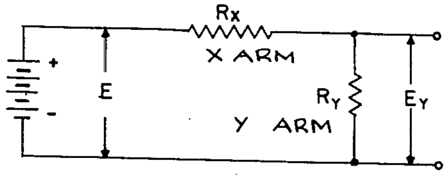
Figure 1:
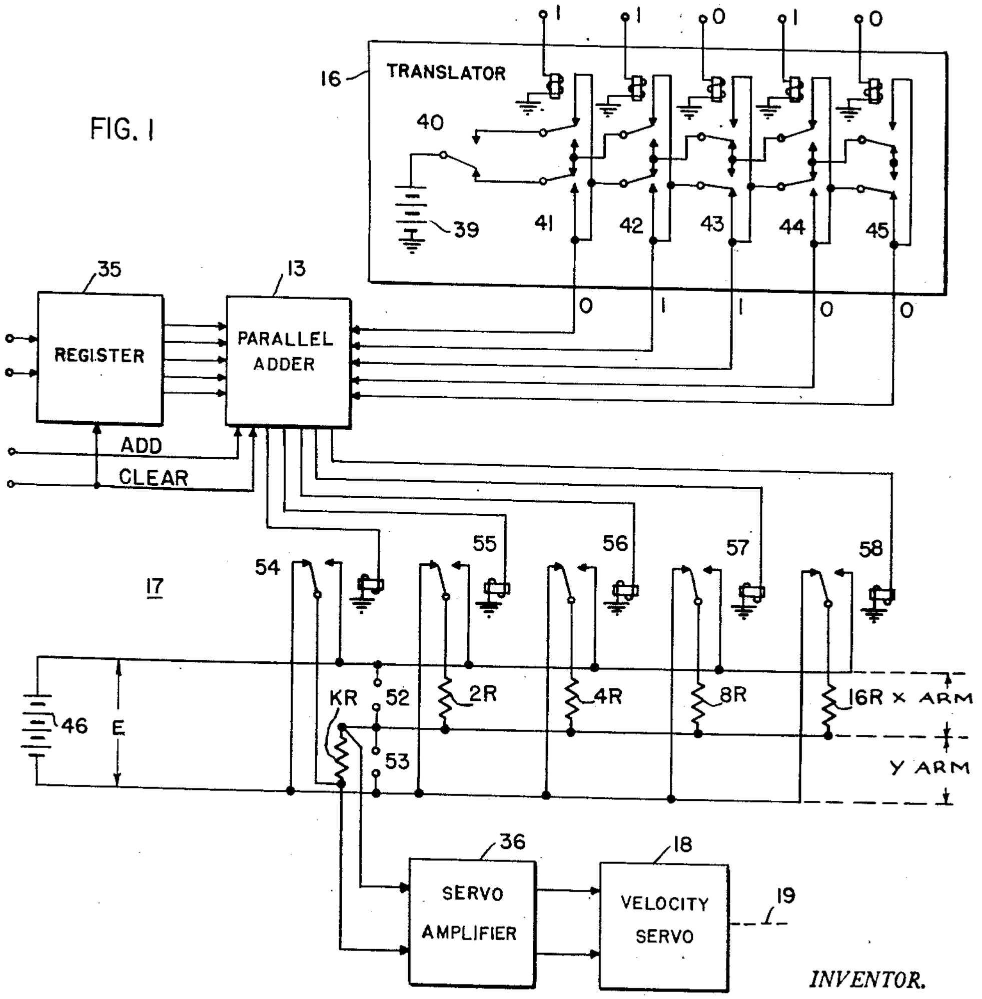
Figure 3:
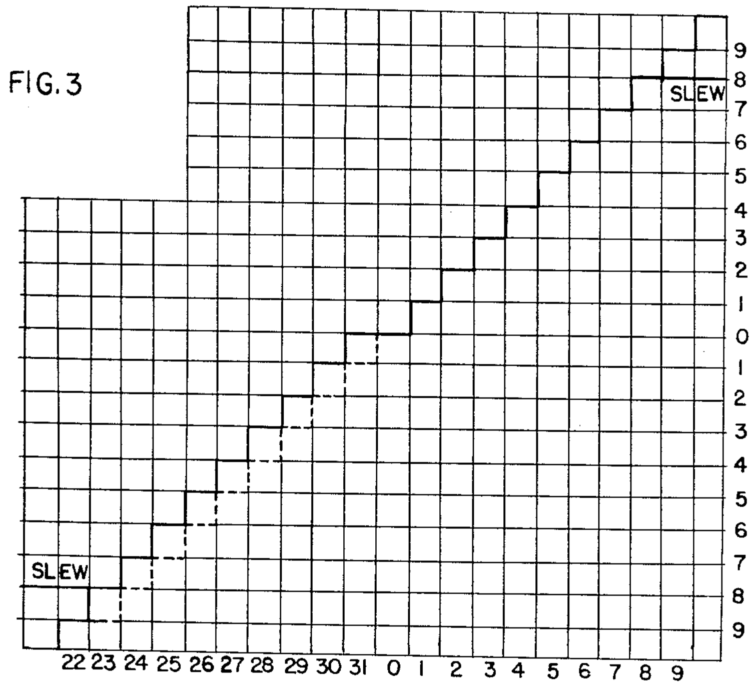
Figure 4:
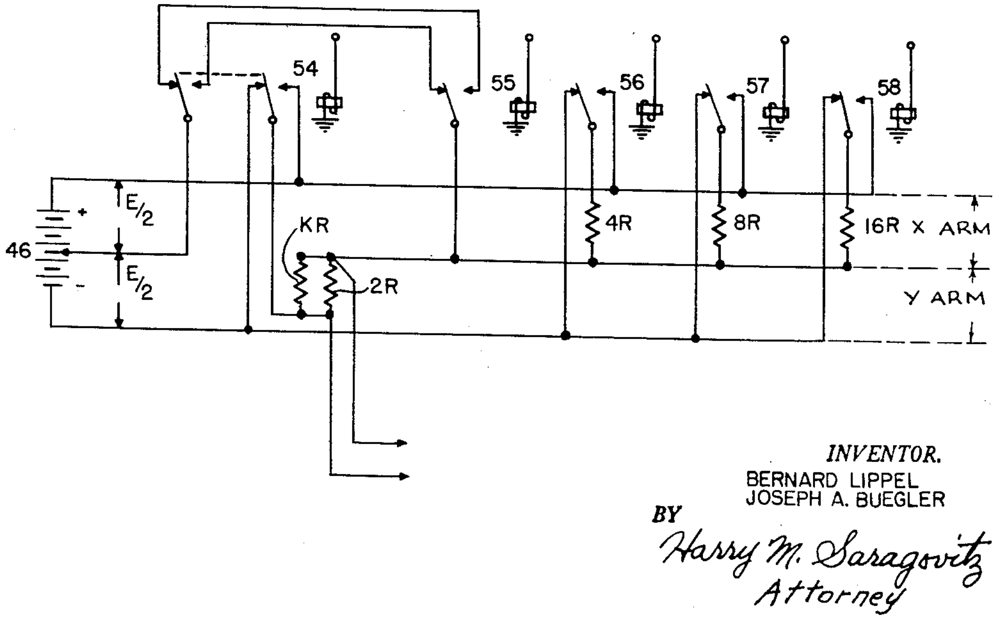
Figure 6:
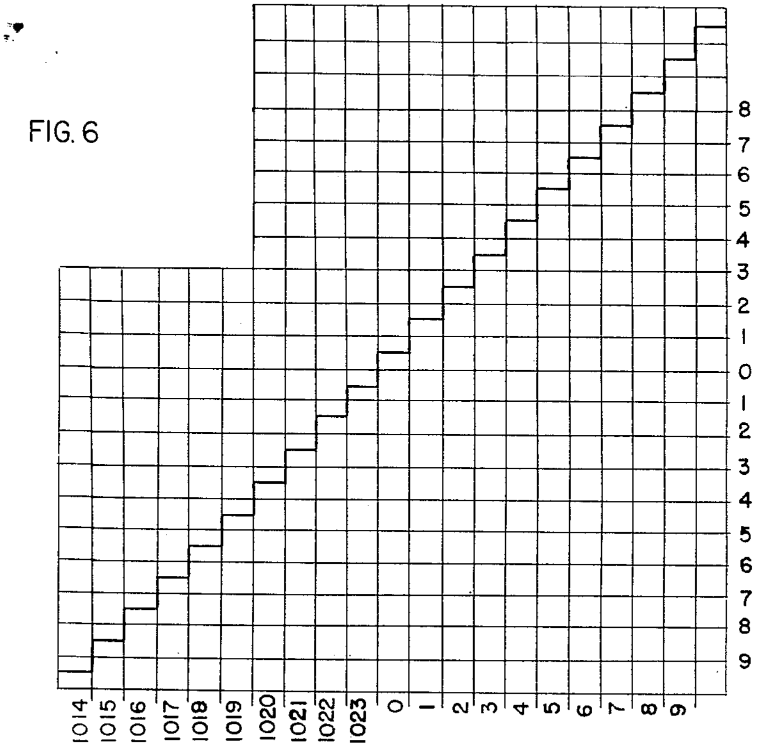
Figure 5:
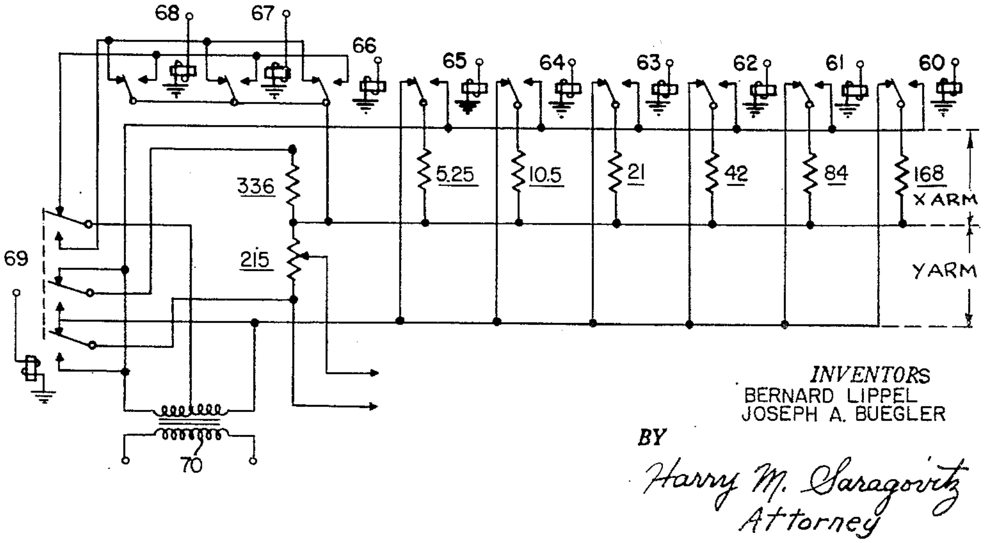

In the drawings Fig. 1 illustrates a fundamental arrangement of the present invention in schematic diagram and in association with elements of a data transmission system; Fig. 2 is a diagram for use in explaining the operation of the decoder; Fig. 3 is a graph illustrating the transfer characteristic of the decoder of Fig. 1; Fig. 4 is a modified arrangement of the decoder of Fig. 1; Fig. 5 is a schematic diagram of a decoder for operation in a ten-digit data transmission system; and Fig. 6 is a graph illustrating the transfer characteristic of the Fig. 5 arrangement.

The data transmission system in which the decoder of the present invention is a preferred part is described in copending application Serial No. 219,101, entitled: "A Data Transmission System," filed concurrently herewith in the name of Millard M. Brenner et al., and assigned to the same assignee, the Government of the United States. To coordinate the present invention with this and other related cases presently to be referred to, the block units indicating apparatus of the general system are here labeled in the drawings to correspond with the labels employed in the referred to application.

Referring now in particular to the drawings, in Fig. 1, the elements of a data transmission system comprise a register 35 which receives digital signals of a binary code group representing the position of an input shaft and stores the digit signals in parallel channels.

The code groups of digit signals recur at a chosen sampling or repetition rate. Accordingly, programming pulses, as indicated by the connections labeled "Clear" and "Add," are also received at the sampling rate. The register is thus periodically cleared at this rate to receive and store, during an interval, successive code groups of digit signals representing instantaneous quantized positions of the input shaft. The parallel outputs of 35, which in the present case are five in order to illustrate five digit code groups, are applied each to an input of a parallel digital adder unit 13. A translator 16 receives, from a local source, not shown (and synchronously with the sampling rate of the input data), digital input signals of a five digit code group number, which signals represent the position of an output shaft in cyclic binary code. Unit 16 translates these signals simultaneously and in parallel channels, to digit signals of standard binary code numbers which represent in complementary number form the output shaft position. The five digit signal outputs from unit 16 are coupled to inputs of the parallel adder 13. The adder unit 13 produces the sum of the input digit signals in five parallel channels and these channels are coupled respectively to the solenoids of relay switches 54, 55, 56, 57 and 58 of the coder labeled 17.

In sequence from left to right the digit signals to the switches 54–58 represent in order the positions of the digits of the binary number. Thus a signal to switch 54 represents the first position or coarsest digit and the inputs to switches 55–58 represent in order the subsequent digits of the input binary number. The decoder is organized to divide a voltage source 46, by switching resistors 2R, 4R, 8R and 16R as required, to produce an output voltage of an amplitude corresponding to the value of the binary number, or its complement, which number is formed by the digit signals of the four subsequent positions. The digit signal of the first position applied to switch 54 switches resistor KR and the output connection to determine the polarity of the output voltage. The output voltage of the decoder is applied to the input of a servo amplifier unit 36. The output of 36 is coupled to a velocity servomotor unit 18 which is adapted to rotate at a velocity and in a direction corresponding to the amplitude and the polarity of the voltage produced by the decoder. The mechanical output of motor 18 is applied via the mechanical connection 19, indicated by dash line, to control the output shaft rotation in correspondence with the input shaft data.

Considering now more particularly the operation of the system, the translator unit 16, for translating from cyclic to standard binary code, has been described in general in the aforementioned patent application and has been described in particular in an application Serial No. 219,103, entitled: "Data Encoder System," filed concurrently herewith in the name of Bernard Lippel et al. and assigned to the same assignee, the Government of the United States. The circuits of the translator are repeated here in the drawing for the purpose of explaining the operation and they form no part of the decoder per se to which the present application relates.

The translator comprises a source of voltage 39 coupled through a switch 40 to a group of serially connected relay operated switches 41–45. As described in the aforementioned applications, the instantaneous positions of a shaft, in this case the output shaft, are encoded recurrently at the sampling rate in digit signals of cyclic binary numbers and these digit signals are coupled to the five input positions of translator 16. An output is provided from each switch position and the operation is such that the presence of a digit signal in any input position of 16 operates to reverse the output voltage from the switches of all subsequent positions. All of the switches 41–45 are normally in the "down" position and are switched to the "up" position when actuated by a digit input signal as shown in the drawings for switches 41, 42, and 44. By this process the digit signals of an input number in cyclic binary code are translated to digit signals of that number in standard binary code when the switch 40 is in the "up" position.

When, however, the switch 40 is in the "down" position as illustrated in the drawing, the output level of each digit signal is reversed. Accordingly, if the input number in cyclic code is as shown on the drawing to be 11010 which corresponds to the decimal number 19, the output number will be 01100 as shown, which corresponds to the decimal number 12. The decimal number 19 is 10011 in standard binary code. The digital output of translator 16 is 01100 which is the same code group reversed and equals the complement of 19 diminished by one. This will be clear when we consider that with the five digit system there is a total of 32 numbers (e. g., the numbers 0–31) and so the sum of the number 19 and its complement 13 must equal 32. The output of translator 16 corresponds to the diminished complement 12.

In practice, however, and for reasons explained in the aforementioned applications, the output number is effectively the true complement of the binary number representing the output shaft position. This is because the error of one unit is a constant for any position of the output shaft and is corrected by a choice of the index position from which the shaft angle is measured. The purpose of the adder 13 is to produce a binary number which is the difference of the input binary number from the register unit 35 and the number representing the position of the output shaft. For this reason, the arrangement provides that the complementary number representing the position of the output shaft is produced by translator 16 and addition in unit 13 is employed instead of subtraction.

The arrangement thus far described produces digit signals simultaneously and in parallel channels which represent the angular difference of the input and output shaft positions. Ordinarily, this difference will be relatively small but to provide for all conditions it must be recognized that the data indicating the position of the input shaft must represent a shaft which may be stationary or rotating rapidly or slowly in either direction. The code groups of digit signals from adder 13, should, therefore, represent a positive or negative angular difference between input and output shafts as conditions require. However, the outputs of 13 represent quantized angular differences over a possible 360° and in order to indicate positive or negative differences the decoder must distinguish numbers which indicate angles of greater than 180° and interpret them as negative angles.

The binary numbers which correspond to decimal numbers 0 to 31, for the 32 positions quantized by a five-digit code group system are characterized by a digit number in the first position for all numbers greater than the number 15, which here corresponds to angles greater than 180°. This is generally true for either standard or cyclic binary code and for code groups having any number of digits. That is, with code groups of $n$ digits, a digit signal in the first position differentiates between the first half of the numbers and the second half of the numbers and where the code groups correspond to sectors dividing a circle of 360°, a digit signal in the first position will distinguish all numbers for angles of greater than 180° from numbers representing angles less than 180°.

Accordingly, the decoder labeled 17 in Fig. 1 is organized so that the digit signal in the first position operates relay switch 54 to reverse the polarity of the output of the decoder when the input number represents an angle greater than 180°. The digit signals for the four subsequent positions operate relay switches 55, 56, 57 and 58 to switch resistors labeled, respectively, 2R, 4R, 8R and 16R from their normal location in parallel with terminals 53, as shown by the positions of the switches in the drawing to locations in parallel with terminals 52. The resistor KR in parallel with the output terminals of the decoder is chosen to control the magnitude of the decoder output voltage steps as will now be explained.

For an understanding of the principles involved in a general case where resistors are switched to produce an output voltage proportional to the weighted values of input digit signals, consider Fig. 2 where two resistors $R_x$ and $R_y$ are in series with a voltage source E and the output voltage is $E_y$. Here $R_x$ and $R_y$ each represent a number of resistors in parallel which number may vary from zero to a maximum of all of the resistors, depending on the switching conditions which obtain. As an example, in the Fig. 1 arrangement of the decoder 17, the switches 54 to 58 are at the left, in their unactuated positions, and accordingly the resistors 2R, 4R, 8R, 16R and the output load resistor KR are all in the Y arm so that the impedance in the X arm is infinite and the output voltage is therefore zero. The ratio of output to source voltage may be written as:

$$\frac{E_y}{E}=\frac{R_y}{R_x+R_y}=\frac{R_yR_x}{R_x+R_y}\cdot\frac{1}{R_x} \qquad (1)$$

The factor $$\frac{R_yR_x}{R_x+R_y}$$

obviously is the value of $R_x$ and $R_y$ in parallel and hence is the value of all the resistances of the network in parallel. It is, therefore, a constant and will be called $R_0$.

Also, $$\frac{1}{R_x}=\left[\frac{1}{AR}+\frac{1}{BR}+\cdots+\frac{1}{DR}\cdots\right] \qquad (2)$$

where the terms in the bracket correspond to reciprocals of the resistances which have been switched into the X arm.

Therefore, Equation 1 becomes:

$$\frac{E_y}{E}=R_0\cdot\frac{1}{R_x}=\left[\frac{R_0}{R}\left[\frac{1}{A}+\frac{1}{B}+\cdots\frac{1}{D}+\cdots\right]\right] \qquad (3)$$

To make the explanation more general, consider a six digit system representing decimal numbers 0–63. If now the digit input signals supplied to a decoder represent the binary number 011010=26, then, according to binary number theory, we may treat the number as a binary fraction by placing a binary point before the number, thus writing it as .011010. It will be noted that the decoder is now called upon to handle numbers from .000000 to .111111, equivalent, respectively, to zero and to 63/64. The value of the number .011010 is, accordingly, the sum of the fractions $$\frac{0}{2}+\frac{1}{4}+\frac{1}{8}+\frac{0}{16}+\frac{1}{32}+\frac{0}{64}, \text{ which equals } \frac{26}{64}$$

It will be evident now that the decoder should be constructed so that resistors of relative values 4R, 8R and 32R are switched from the Y arm to the X arm on receipt of the digit signals of this number. Accordingly, the output will be $$E_y=E\frac{R_0}{R}\left[\frac{0}{2}+\frac{1}{4}+\frac{1}{8}+\frac{0}{16}+\frac{1}{32}+\frac{0}{64}\right]=E\frac{R_0}{R}\frac{26}{64}$$

In general, a first position digit signal will control a switch which transfers a resistance of relative value 2 from the Y arm to the X arm; a second position digit signal similarly will transfer a resistor of relative value 4, and so on. Accordingly, the coefficients A, B, C, D, E, etc., in the Equation 3 will have values of 2, 4, 8, 16, 32, etc.

When these values are employed, the decoding process yields a voltage output (A.-C. or D.-C., depending only on E) which is proportional to (1) the numerical value of the input binary number; (2) the source voltage E and the factor $$\frac{R_0}{R}$$

The last named factor permits convenient adjustment of the constant of proportionality by variation of the load resistance which affects $R_0$.

It will also be evident that if the output is switched from across $R_y$ to $R_x$ by switching only the lower connection of the output load, then the output voltage is $$-E_x=-ER_0\frac{1}{R_y}$$

Since the resistors have not been switched but only the output connections, it follows that, $$-E_y=-E\frac{R_0}{R}\left[\frac{1}{2}+\frac{0}{4}+\frac{0}{8}+\frac{1}{16}+\frac{0}{32}+\frac{1}{64}\right]=-E\frac{R_0}{R}\times\frac{37}{64}$$

The output polarity is now reversed and has an amplitude corresponding to an input number 100101=37 which is the complement of the input number diminished by 1. The true complement would be 100110=38, since 38 plus 26=64, the total number of values in a six digit binary system.

In effect, the reversal of the output connection reverses all input digits from zeros to ones and vice versa. Otherwise stated, the reversal of the output load connection assigns to the input digit signals a condition of operation as reversed code group signals.

Returning now to the description of Fig. 1, the decoder 17 is designed for five input digit signals from adder 13 as above described. A digit signal in the first position acts only to operate switch 54 to reverse the load connection. The digit signals for the four subsequent digit positions now serve as signals of a four digit code group and operate switches 55–58 to produce an output potential proportional to the value of the four digit binary number which they represent. Conversely, they act as reversed signals of a four digit code group if a digit signal to the first position switch 54 causes a reversal of output.

Consider as a simplified case that $K=16$. Then, since $R_0$ is the value of all resistors in parallel, a calculation shows that $R_0=R$ and $$\frac{E_y}{E}=\frac{R}{R_x}$$

For the sixteen possible switching combinations of the four switches 55–58 for input numbers 0–15, the ratio $$\frac{E_y}{E}$$

will now change in steps of 0, 1/16R, 2/16R, 3/16R, . . . 15/16R.

Conversely, with a digit signal in the first position to the decoder for input number 16–31, the output ratio $$\frac{-E_x}{E}$$

will change in steps of 1/16R. A plot of the ratio $$\frac{E_0}{E}$$

for the decoder of Fig. 1, where $E_0$ is the output voltage, is shown by the solid line graph of Fig. 3. It will be that there are two zero values in the plot, one for the input number 00000 where all resistors are in the Y arm and the other for the input number 11111 where all are in the X arm. To correct for this condition of a discontinuity of regular steps or increments of output voltage through the zero region of compensation can be made in several ways. For example, the introduction of an unsymmetrical step in the switching can be made which effectively assigns to the input digits signals a condition of operation as reversed code group digit signals plus one digit.

Consider for example in the Fig. 1 arrangement, a resistor of value 16R connected permanently in the Y arm at terminals 53, and, to keep the example simple, consider K as infinite (i. e., the input impedance of amplifier 36 is made very high so that the load resistance KR is infinite), then $R_0$ is unchanged and the operation is unchanged for input numbers 0–15. For input numbers 16–31, however, where reversal of output polarity occurs, an extra negative step has been added. This will be evident when we consider the input number 11111=31, which throws all switches to the right. Now, instead of zero output there is a negative output of 1 step and similarly the step is added to all positions where reversal obtains. The modified part of the characteristic is shown by the dotted line steps of Fig. 3.

Conversely, the resistor of value 16R can be included permanently in the X arm by connecting it at terminals 52 and the upper half of the characteristic will be moved bodily upward by one step to avoid a "double zero" level.

To trace the circuit operation of decoder 17 of Fig. 1 let us assume that the input number produced by the parallel adder 13 is the binary code groups signal 01011=11. Accordingly switches 54 and 56 are unactuated while switches 55, 57 and 58 are actuated so that each switch is thrown to the right and resistors 2R, 8R and 16R are thereby switched from the Y arm to the X arm.

Let us further assume that battery 46 supplies a potential, E, of 16 volts, that between the terminals 53 there is connected a resistor of value 16R to provide a permanent incremental voltage step in the Y arm and that K=infinity (which means that the resistor KR has been removed). For these conditions it will be evident that the parallel value of all elements, $R_0$ equals R. Substituting in Equation 3 of column 5 gives the following:

$$E_y=E\frac{R_0}{R}\left[\frac{1}{2}+\frac{0}{4}+\frac{1}{8}+\frac{1}{16}+\frac{0}{16}\right]=16\times\frac{11}{16}=11 \text{ volts}$$

This is the corrected magnitude and polarity of output potential required.

Let us now assume that the input number is 11011=+27 or −5. It will be noted that this binary number is identical to that of the previous case, the number 11, except for a digit signal in the first position. The first position digit signal actuates switch 54 thereby switching the output terminals from the Y arm to the X arm and reversing the output polarity. It will be noted that there has been no change in the switching of relay switches 55 to 58. Nevertheless, the switching of the output is effective to assign to the input digit signals, which actuate switches 55–58, a condition of operation as reversed code group signals. In other words the condition of operation is as though these switches were energized by the digit signals 0100 instead of by digit signals 1011. Again employing the equivalent of Formula 3 we obtain the following:

$$E_x=-E\frac{R_0}{R}\left[\frac{0}{2}+\frac{1}{4}+\frac{0}{8}+\frac{0}{16}+\frac{1}{16}\right]=-16\times\frac{5}{16}=-5 \text{ volts}$$

which is the magnitude and polarity which correctly represents the analogue value.

In these two examples the last term in the bracket represents the resistor 16R, connected at terminals 53, which is not switched.

It is interesting to note, for these specific examples, that the decoder produces across the Y arm a potential corresponding to the sum of the weighted values of the input binary number (excepting the first or most significant digit) and simultaneously produces across the X arm a potential corresponding to the complement of the input number. Accordingly when the digit signal in the first position is a 1 to switch the output from across the Y arm to across the X arm, the output is a potential of magnitude corresponding to the complement and the polarity is reversed thereby to decode the input signal as a negative number. It is also to be noted that the first position or most significant digit is not decoded but is used only as a switching signal. By this it is meant that no potential is produced which represent the weighted value of the most significant digit.

It will be clear, therefore, that the arrangement of the decoder as thus far described is such as to produce an output voltage in sixteen incremental positive steps for input numbers representing a difference between output and input shaft positions where the difference angle is positive and conversely in sixteen incremental steps of negative polarity where the angular difference is negative.

The magnitude of each incremental step in terms of output voltage depends, of course, upon the magnitude of the source voltage E supplied by the battery 46 and the choice of the coefficient K. There is, however, a condition of operation to be considered in the practical case where the speed of the servomotor 18 should be limited to a maximum rate because of the apparatus which must be controlled by the output shaft. For this reason it is desirable to have the decoder provide successive incremental increases in the motor speed up to some chosen predetermined limit and thereafter for all input numbers greater than those which produce this maximum speed, the speed should remain constant. Accordingly, the circuit of Fig. 1 is modified to produce what is termed slewing. This modification is illustrated in Fig. 4 where the values of the resistors are as in Fig. 1, but the resistor 2R which causes a maximum change in the motor speed is shown connected in parallel with output load resistor KR to be switched only when the output polarity is switched by relay switch 54. The switch 54 is now made to be a double-pole, double-throw switch and the switching member of the added switch section is connected to a center tap on the source 46 to divide the source voltage into two halves, each of value $$\frac{E}{2}$$

For the switch 55, which formerly operated to switch the resistor 2R, no resistor is included in the connection to the switching element.

The operation of the arrangement is, therefore, as follows. For input number 0–7 and 24–31, the operation is exactly as previously described. However, for numbers 8–15, the switch 55 is operated to make the output voltage of constant value $$\frac{E}{2}$$

Accordingly, the transfer characteristic of incremental steps obtains for numbers 0–7 but for numbers greater than 7, the characteristic is slewed to a constant value $$\frac{E}{2}$$

To make this operation smooth and consistent, the value R is chosen together with the value of the source E so that, for example, the output voltage will change in incremental steps of, say, one volt to a maximum value of 8 volts which is equal to $$\frac{E}{2}$$

Similarly, for input numbers greater than 15, this slewing action is reversed so that in practice negative incremental voltage steps are provided from 0 through −7, after which the slewing operation obtains in the negative direction. This operation is shown on the graph of Fig. 3 where the slewing level is indicated.

To trace the circuit operation of Fig. 4 let us assume, as in the previous example wherein the operation of Fig. 1 was traced, that the input number is again 01011=11 and accordingly, as with the Fig. 1 decoder, the relays 55, 57 and 58 are actuated. The result here is that, while resistors 8R and 16R are switched into the X arm as before, relay switch 55 connects the center tap of the voltage source 46 into the circuit so that a voltage $E/2$ is connected directly across the X and Y arms and therefore across the decoder output. It is evident that this is a maximum voltage which is applied to the output when the input number exceeds 8, but is less than 16. That is, slewing action is effected at this point.

Conversely when the input number is

11011=−5 as in the previous example when the operation of Fig. 1 was traced, the only change is to actuate relay switch 54 by throwing the both switch arms to the right. This removes the direct connection of the source voltages $E/2$ from across the X and Y arms and transfers the output from the Y arm to the X arm. The X output potential now corresponds to a value of −4. The output here is −4 instead of −5 because in this particular illustration and added resistor of value 16R has not been placed permanently across the Y arm to provide an added incremental step. The operation of Fig. 4, therefore, follows the solid line characteristics shown in Fig. 3 where the slewing is effected at steps of plus and minus 8.

Consider now an arrangement for a ten-digit system which is shown in Fig. 5 and which has been operated successfully in practice. Here the source of voltage is A.-C. and is provided at the secondary of transformer 70 designed so that the A.-C. output voltage is 25 volts. Ten switch positions are here indicated as switches 60 to 69. The switches 60–65 operate to switch resistors indicated by their values in kilohms. Switches 66, 67 and 68 provide for slewing the output voltage to a constant value of 12½ volts, for either an initial polarity or the reversed polarity of output.

The switch 69 which reverses the polarity of output for input numbers indicating angular differences of greater than 180° is here provided with 2 extra switch sections, one of which corresponds to the added section shown in Fig. 4 whereby the slewing operation is effective for both positive and negative values of output. The additional section is to provide for the resistor labeled 336 kilohms. This resistor has a value twice as great as the resistor which is switched by the relay 60 and accordingly, it will be clear that the presence of resistor 336 in either the Y or the X arm of the decoder will produce a half voltage step as will be evident by a consideration of the switching connections. The switch 69 operates to switch resistor 336 from the Y to the X arm whenever the output is switched in polarity (i. e., when a digit signal appears on 69). Accordingly, the transfer characteristic which is shown over a portion of its range in Fig. 6 is displaced a half step upward for one polarity of output voltage and is switched downward one step for the opposite polarity of output voltage. A consideration of the transfer characteristic of Fig. 6 indicates that there is no zero output position. However, as in the modified characteristic shown in Fig. 3, the changes through the zero position are in regular and equal increments. In practice, an advantage obtains from having no actual zero output position, since it has been found desirable to always have a small initial potential, either positive or negative as conditions required, applied to the output velocity servo.

The slewing operation is beyond the upper and lower limits of the portion of the characteristic shown in Fig. 6, but it will be evident from a consideration of the circuit that in the positive direction incremental steps for numbers 0–63 are provided after which the operation slews off at level 64. Conversely, in the negative direction, slewing obtains for input numbers which are less than the number 960. The step values shown in Fig. 6 for the case of a 25 volt output from transformer 17 will correspond to incremental steps of about $\frac{1}{5}$ of a volt, so that a very smooth variation is provided. If the condition occurs where the data received corresponds to a rapid acceleration of the input shaft, the output shaft may lag behind the input shaft up to 180°, but if the lag exceeds 180°, reversal occurs and the output shaft reaches agreement with the input shaft by reversing and meeting the position of the output shaft in the opposite direction.

To trace the operation of this circuit let us assume that the input number is 0111111100=508 whereby all relays switches are actuated (that is the switches are thrown to the right), except switches 60, 61 and 69. Under these conditions it will be clear that an alternating current potential of magnitude corresponding to 12½ volts is provided at the output terminals. This represents a slewing action at the maximum level of 12½ volts because the input number exceeds plus sixty three and the actuation of any of switches 66, 67 and 68 places 12½ volts across both the X and Y arms. Let us now consider that the input number is 1111111100=1020. The switch 69 is now actuated while other switch conditions are unchanged. Actuation of switch 69 now puts resistor 215 in the X arm, thus switching the polarity of A. C. output voltage, put resistor 336 in the Y arm to reverse the direction of the incremental step and removes the 12½ volt maximum potential from across the X and Y arms. Accordingly the output potential is $3\frac{1}{2}\times\frac{1}{16}$ of a volt as can be read from the transfer characteristic of Fig. 6 for the input number 1020.

In the illustrations that have been given, the switches illustrated have been of the ordinary magnetic relay type and for many purposes, where the apparatus to be operated by the output shaft is massive and can not be operated with excessive speed, this type of relay is satisfactory. It will be clear, of course, that for operations of output elements which require higher speeds, the relays illustrated may be a limitation to the speed of operation. It will be apparent, however, to those skilled in the electronic art that the relay switches may be in all cases replaced by suitable combinations of electron tubes and circuits which are functionally equivalent to the mechanical relays illustrated.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A decoder for digital code group signals comprising a source of potential, a divider circuit therefor comprising an X arm and a Y arm in series with said source, said arms being comprised of a plurality of impedance elements adapted to be switched from one arm to the other, an output circuit for said divider, means responsive to the digit signal in the first position of said group for switching said output circuit from one arm to the other to determine the polarity of output potential and means responsive to the digit signals in the remaining positions of said group for switching said elements to determine the magnitude of said output potential.

2. A decoder for digital code group signals comprising a source of potential, a divider circuit therefor comprising an X arm and a Y arm in series with said source, said arms being comprised of a plurality of impedance elements adapted to be switched from one arm to the other, an output circuit for said divider, means responsive to the digit signals in the first position of said group for switching said output circuit from one arm to the other to determine the polarity of output potential and means responsive to the digit signals in the remaining positions of said group for switching said elements to determne the magnitude of said output potential, said last named means comprising means for limiting said magnitude to a predetermined level which is less than the maximum level determinable by said digit signals.

3. A decoder for digital code group signals comprising a source of potential, a divider circuit therefor comprising an X arm and a Y arm in series with said source, said arms being comprised of a plurality of impedance elements adapted to be switched from one arm to the other, an output circuit for said divider, parallel operating means responsive to the digit signal in the first position of said group for switching said output circuit from one arm to the other to determine the polarity of output potential and responsive to the digit signals in the remaining positions of said group for switching said elements to determine the magnitude of said output potential.

4. A decoder for digital code group signals of a standard binary number having a chosen maximum number of digits comprising a source of potential, a divider circuit therefore comprising an X arm and a Y arm in series with said source, said arms being comprised of a plurality of impedance elements adapted to be switched from one arm to the other, each element corresponding to a one of the digits of said number which are subsequent to the first position digit, an output circuit for said divider, an impedance element in parallel with said output circuit, means responsive to the digit signal in the first position of said group for switching said output circuit from one arm to the other to determine the polarity of output potential and means responsive to the digit signals in the subsequent positions of said group for switching said elements to determine the magnitude of said output potential.

5. A decoder in accordance with claim 4 which further comprises in said divider circuit a fixed impedance element in one of said arms of a value to add an incremental step of magnitude to said output potential for one polarity of output only.

6. A decoder for digital code group signals of a standard binary number having a chosen maximum number of digits comprising a source of potential, a divider circuit therefor comprising an X arm and a Y arm in series with said source, said arms being comprised of a plurality of impedance elements adapted to be switched from one arm to the other each element corresponding to a one of the digits of said number which are subsequent to the first position digit, said elements having relative impedance values inversely proportional to the relative values of the digits to which they correspond, an output circuit for said divider, an impedance element in parallel with said output circuit, said element having a value chosen to determine the magnitude of output voltage steps, means responsive to the digit signal in the first position of said group for switching said output circuit from one arm to the other to determine the polarity of output potential and means responsive to the digit signals in the subsequent positions of said group for switching said elements to determine the magnitude of said output potential.

7. A decoder in accordance with claim 6 which further comprises in said divider circuit a fixed impedance element in one of said arms of a value to add an incremental step of magnitude to said output potential for one polarity of output only.

8. A decoder for digital code group signals of a standard binary number having a chosen maximum number of digits comprising a source of potential, a divider circuit therefor comprising an X arm and a Y arm in series with said source, said arms being comprised of a plurality of impedance elements adapted to be switched from one arm to the other each corresponding to a one of a chosen number of the digits of said number which are subsequent to the first position digit, said elements having relative impedance values inversely proportional to the relative values of the digits to which they correspond, an output circuit for said divider, an impedance element in parallel with said output circuit, said element having a value chosen to determine the magnitude of output voltage steps, means responsive to the digit signal in the first position of said group for switching said output circuit from one arm to the other to determine the polarity of output potential, means responsive to the digit signals of said chosen number of digits in the subsequent positions of said group for switching said elements to determine the magnitude of said output potential, and switching means responsive to the unchosen digit signals in the subsequent positions of said group for limiting said magnitude at a predetermined level.

9. A decoder in accordance with claim 8 which further comprises in said divider circuit a fixed impedance element in one of said arms of a value to add an incremental step of magnitude to said output potential for one polarity of output only.

References Cited in the file of this patent

UNITED STATES PATENTS

| Number | Name | Date |
|---|---|---|
| 1,587,122 | Harlow | June 1, 1926 |
| 2,132,213 | Locke | Oct. 4, 1938 |
| 2,458,030 | Rea | Jan. 4, 1949 |
| 2,537,427 | Seid et al. | Jan. 9, 1951 |
| 2,564,403 | May | Aug. 14, 1951 |
| 2,630,552 | Johnson | Mar. 3, 1953 |
| 2,658,139 | Abate | Nov. 3, 1953 |